United States Patent
Ishikawa

(10) Patent No.: US 10,011,144 B2
(45) Date of Patent: Jul. 3, 2018

(54) CAP

(71) Applicant: TOYOTA JIDOSHA KABUSHIKI KAISHA, Toyota-shi, Aichi-ken (JP)

(72) Inventor: Tomoyuki Ishikawa, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 14/918,141

(22) Filed: Oct. 20, 2015

(65) Prior Publication Data

US 2016/0152070 A1 Jun. 2, 2016

(30) Foreign Application Priority Data

Nov. 27, 2014 (JP) .................. 2014-240370

(51) Int. Cl.
*B60B 7/08* (2006.01)
*B60B 7/04* (2006.01)
*B60B 7/06* (2006.01)

(52) U.S. Cl.
CPC ............. *B60B 7/08* (2013.01); *B60B 7/04* (2013.01); *B60B 7/066* (2013.01)

(58) Field of Classification Search
CPC .. B60B 7/08; B60B 7/066; B60B 7/04; B60B 7/0013
See application file for complete search history.

(56) References Cited

U.S. PATENT DOCUMENTS

| 2,726,900 | A | * | 12/1955 | Lothar Stanetzki | ...... B60B 3/14 |
| | | | | | 301/35.61 |
| 3,177,041 | A | * | 4/1965 | Isenbarger | .............. B60B 7/002 |
| | | | | | 301/108.2 |
| 8,801,107 | B2 | * | 8/2014 | Schmid | ...................... B60B 3/10 |
| | | | | | 301/37.107 |
| 9,327,340 | B1 | * | 5/2016 | Bazerkanian | .......... B21D 53/32 |
| 2007/0246996 | A1 | * | 10/2007 | Footit | ................... B60B 7/0053 |
| | | | | | 301/37.108 |

FOREIGN PATENT DOCUMENTS

| JP | S60-166603 U | | 11/1985 | | |
| JP | H08-48102 A | | 2/1996 | | |
| JP | 2011-016426 A | | 1/2011 | | |
| JP | 2011016426 A | * | 1/2011 | ............... | B60B 7/08 |
| KR | 20110131930 A | * | 12/2011 | ............... | B60B 7/08 |

* cited by examiner

*Primary Examiner* — Kip T Kotter
*Assistant Examiner* — Scott A Browne
(74) *Attorney, Agent, or Firm* — Oliff PLC

(57) ABSTRACT

A cap mounted to a mounting hole of a wheel, the mounting hole being formed to have a circumferential groove, includes: a circular body; a circular support; a circumferential projection that projects relative to an outer circumferential surface of the body in a radial direction; and a joint shaft. An outermost diameter of the circumferential projection is not more than an inner diameter of the mounting hole. The circumferential projection enters the circumferential groove of the mounting hole so that the cap is mounted to the wheel.

6 Claims, 8 Drawing Sheets

CAP

BACKGROUND OF THE INVENTION

1. Field of the Invention

The present invention relates to a cap mounted to a mounting hole of a wheel.

2. Description of the Related Art

Patent document 1 discloses a cylindrical center cap mounted to a hub hole formed at the center of a wheel. The center cap is provided with a plurality of notches formed on the outer circumferential surface and a locking piece extending in the notches in the axial direction. The locking pieces are provided so that they can be bent in the radial direction. The tip of the locking pieces has a pawl that projects radially outward. The center cap is inserted into the hub hole of the wheel and is mounted to the wheel as the pawl of the locking piece is locked in a groove of the hub hole.

[patent document 1] JP2011-16426

According to the technology disclosed in patent document 1, the center cap is mounted to the wheel by bending the locking piece so that the pawl at its tip is locked in the groove of the hub hole. Because the locking piece undergoes stress when bent, the locking piece may be deformed over time.

SUMMARY OF THE INVENTION

The present invention addresses the aforementioned issue and a purpose thereof is to provide a technology adapted for a cap mounted to a mounting hole of a wheel, whereby an external force that would deform a stopper for preventing the cap from being dislodged from the mounting hole is not exerted, or an external force as exerted is reduced.

An embodiment of the present invention that addresses the above issue relates to a cap mounted to a mounting hole of a wheel, the mounting hole being formed to have a circumferential groove, including: a circular body; and a circumferential projection that projects relative to an outer circumferential surface of the body in a radial direction. An outermost diameter of the circumferential projection is not more than an inner diameter of the mounting hole. The circumferential projection enters the circumferential groove of the mounting hole so that the cap is mounted to the wheel.

According to this embodiment, the outermost diameter of the circumferential projection is not more than the inner diameter of the mounting hole so that the cap can be easily inserted into the mounting hole. Because the circumferential projection is inserted into the mounting hole without being deformed and is engaged with the circumferential groove by entering the circumferential groove, an external force that would deform the circumferential projection is not exerted from the mounting hole, or an external force is reduced.

The cap may further include a joint shaft that joins the body and the circumferential projection. The circumferential projection may include a through hole through which the joint shaft is inserted. An outer diameter of the joint shaft may be smaller than an inner diameter of the through hole. Because the circumferential projection becomes eccentric with respect to the joint shaft due to the gravity and the centrifugal force occurring during rotation of the wheel, the amount by which the circumferential projection enters the circumferential groove is increased as compared to the case where the circumferential projection is not eccentric with respect to the joint shaft.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
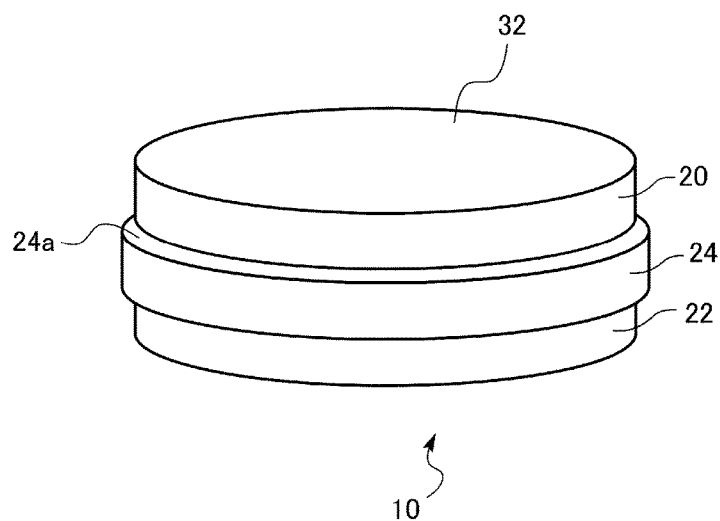
FIG. 1 is a perspective view of a cap according to the first embodiment.

FIG. 1 is a perspective view of a cap 10 according to the first embodiment. The cap 10 is mounted to a cylindrical mounting hole formed at the center of a wheel and blocks the mounting hole. A designed surface 32 on the front of the cap 10 may be designed decoratively. The cap 10 functions as an ornament decorating the surface of the wheel of, for example, an automobile. The wheel is made of a metal and the cap 10 is made of a resin. The cap 10 may also be made of a metal.

The cap 10 is provided with a circular body 20, a circular support 22, and a circular circumferential projection 24. The surface of the body 20 forms the designed surface 32. The circumferential projection 24 is formed to have a diameter larger than the outer diameter of the body 20 and the support 22. The circumferential projection 24 forms a projecting part 24a that projects radially outward relative to the body 20 and the support 22. The projecting part 24a is engaged with the circumferential groove of the mounting hole of the wheel and provides a stopper for preventing dislodging. The outer circumferential surface of the body 20, the support 22, and the circumferential projection 24 is configured as a columnar surface. The cap 10 may be molded as one piece by die-cutting and may have a shape of a cup having a hollow space inside. The cap 10 may be formed by a plurality of separate members, as illustrated in the next drawing.

Figure 2:
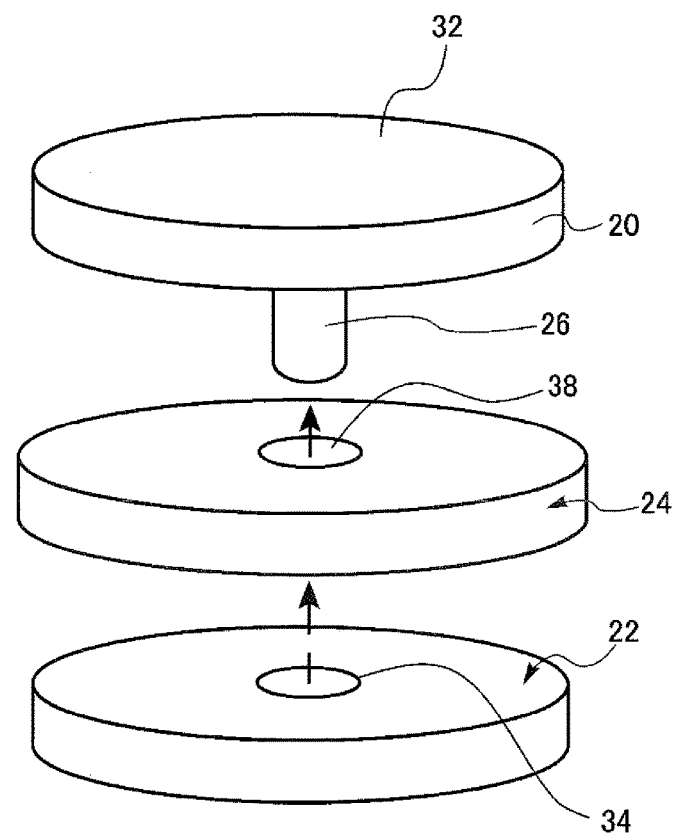
FIG. 2 is an exploded view of the cap.

FIG. 2 is an exploded view of the cap 10. Like numerals represent like elements so that the description will be omitted accordingly. The cap 10 is provided with a disc-shaped body 20, a disc-shaped support 22, a disc-shaped circumferential projection 24, and a joint shaft 26. The circumferential projection 24 is sandwiched between the body 20 and the support 22. The joint shaft 26 in a rod shape joins the body 20, the support 22, and the circumferential projection 24.

The joint shaft 26 may be formed on the rear side of the body 20 so as to be integrated with the body 20. Alternatively, the joint shaft 26 may be formed as a member separate from the body 20 and secured to the rear side of the body 20. At the center of the circumferential projection 24 is provided a through hole 38 into which the joint shaft 26 is inserted.

The support 22 has the same diameter as the body 20 and has a joint hole 34 at the center to secure the joint shaft 26 in the joint hole 34. The inner diameter of the joint hole 34 is substantially equal to the inner diameter of the through hole 38 and the diameter of the joint shaft 26. By configuring the support 22 to have the same diameter as the body 20, inclination of the cap 10 inside the mounting hole is controlled without sacrificing ease of insertion into the mounting hole. Thus, the cap 10 may be formed by a plurality of members.

Figure 3A:
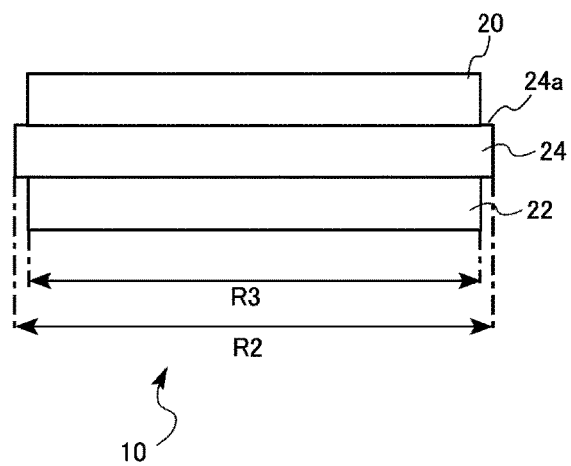
FIG. 3A is a side view of the cap.
Figure 3B:
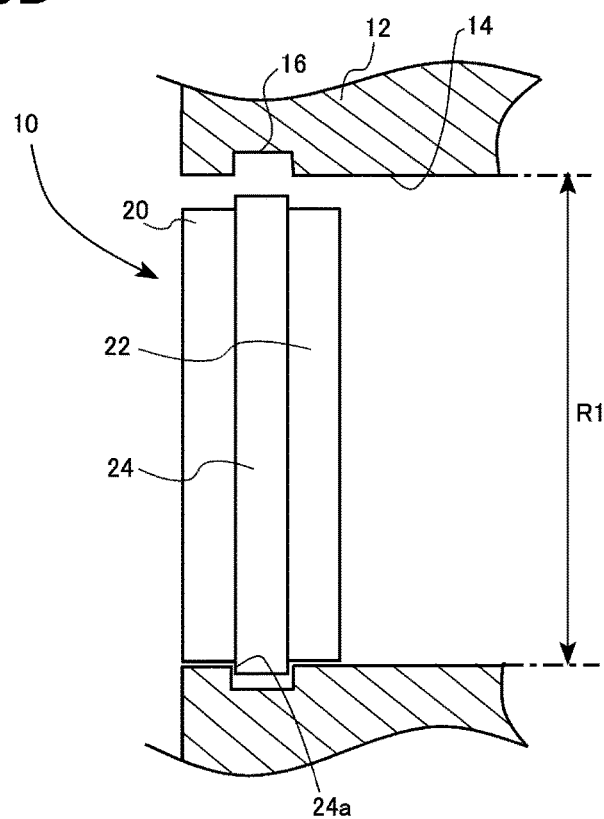
FIG. 3B shows how the cap is mounted to a mounting hole.

FIG. 3A is a side view of the cap 10, and FIG. 3B is a schematic diagram showing how the cap 10 is mounted to a mounting hole 14. FIG. 3B shows the cap in a side view and the wheel 12 in a cross sectional view.

As shown in FIG. 3B, the mounting hole 14 formed at the center of the wheel 12 has a circumferential groove 16 formed to recede circumferentially in the middle of the inner circumferential surface. The axial length of the circumferential groove 16 is slightly larger than the axial length of the circumferential projection 24 and the circumferential groove 16 accepts the projecting part 24a of the circumferential projection 24.

The outer diameter R2 of the circumferential projection 24 is configured to be larger than the outer diameter R3 of the body 20 and the support 22. The outer diameter R2 of the circumferential projection 24 is configured to be not more than the inner diameter R1 of the mounting hole 14.

The cap 10 is mounted to the wheel 12 by being inserted into the opening of the mounting hole 14, with the support 22 being the leading edge, and by the circumferential projection 24 entering the circumferential groove 16. By configuring the outer diameter R2 of the circumferential projection 24 to be not more than the inner diameter R1 of the mounting hole 14, the cap 10 can be easily inserted.

As shown in FIG. 3B, the circumferential projection 24 enters the circumferential groove 16 eccentrically with respect to the central axis of the mounting hole 14 due to the gravity and the centrifugal force occurring during rotation, thereby preventing the cap 10 from being dislodged. More specifically, the body 20 and the support 22 come into contact with the inner circumferential surface of the mounting hole 14, with the cap 10 being eccentric with respect to the central axis of the mounting hole 14. The projecting part 24a of the circumferential projection 24 enters the circumferential groove 16, thereby preventing the cap 10 from being dislodged. For convenience of description, FIG. 3B schematically shows a gap between the mounting hole 14 and the cap 10 on an enlarged scale. In practice, however, the gap between the cap 10 and the mounting hole 14 is so small that the cap 10 never falls down inside the mounting hole 14.

The outer diameter R3 of the body 20 and the support 22 is configured to be about 60 mm. The difference between the outer diameter R2 of the circumferential projection 24 and the outer diameter R3 of the body 20 and the support 22 is configured to be within a range 1.0-1.8 mm. In other words, the projecting part 24a of the circumferential projection 24 has a radial length of 0.5-0.9 mm and overhangs the circumferential groove 16. This ensures that the projecting part 24a overhangs the circumferential groove 16 and the body 20 and the support 22 can have a large diameter at the same time. By securing a large outer diameter R3 of the body 20 and the support 22, the difference from the inner diameter R1 of the mounting hole 14 is reduced accordingly and the cap 10 mounted to the mounting hole 14 is prevented from becoming too loose.

Further, the ratio of the difference between the outer diameter R2 of the circumferential projection 24 and the outer diameter R3 of the body 20 relative to the outer diameter R3 of the support 22, i.e., (R2–R3)/R3 is configured to the within a range of 1.67% to 3.00%. The outer diameter R3 of the body 20 may be other than about 60 mm and is configured in accordance with the diameter of the mounting hole 14 of the wheel. This ensures that the projecting part 24a overhangs the circumferential groove 16 and the body 20 has a large outer diameter R3 at the same time.

More preferably, the difference between the outer diameter R2 of the circumferential projection 24 and the outer diameter R3 of the body 20 and the support 22 is configured to be within a range 1-1.4 mm. In other words, the projecting part 24a of the circumferential projection 24 has a width of 0.5-0.7 mm and overhangs the circumferential groove 16. The difference between the inner diameter R1 of the mounting hole and the outer diameter R3 of the body 20 and the support 22 may be configured to be not more than 1.8 mm.

The difference between the axial length of the circumferential groove 16 and the axial length of the circumferential projection 24 is configured to be not more than 1 mm. This prevents the cap 10 mounted to the mounting hole 14 from becoming too loose in the axial direction. More preferably, the difference between the axial length of the circumferential groove 16 and the axial length of the circumferential projection 24 may be configured to be not more than 0.6 mm.

The axial length of the support 22 may be more than the axial length of the circumferential projection 24. By securing a sufficient axial length of the part that can come into contact with the inner circumferential surface of the mounting hole 14, inclination of the cap 10 inside the mounting hole 14 is controlled.

As described above, the cap 10 can remain mounted by causing the cap 10 to be eccentric with respect to the central axis of the mounting hole 14 and allowing the circumferential projection 24 to enter the circumferential groove 16 accordingly. Because the circumferential projection 24 is inserted into the mounting hole 14 without being deformed and drops into the circumferential groove 16 for engagement therewith, the circumferential groove 16 does not exert an external force that would deform the circumferential projection 24 and durability of the portion of the cap 10 involved in preventing dislodging is increased accordingly.

Figure 4A:
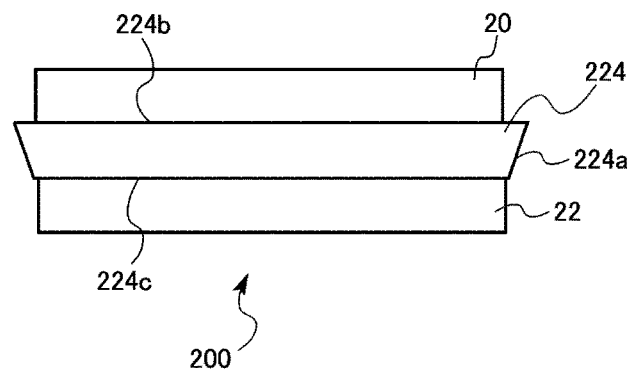
FIGS. 4A-4C show alternative embodiments.
Figure 4B:
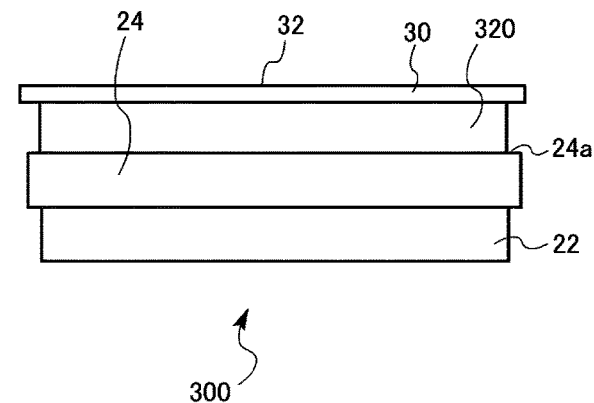
Figure 4C:
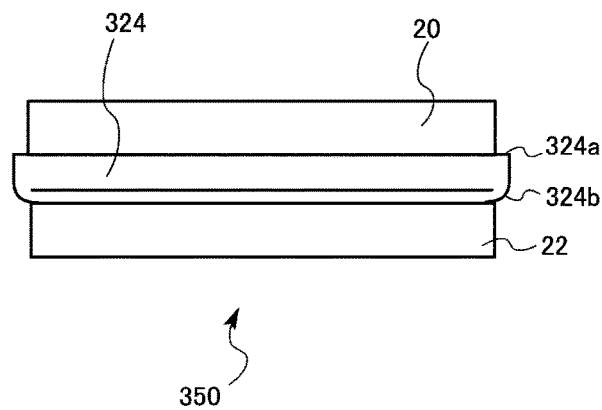

FIGS. 4A-4C show alternative embodiments. FIG. 4A is a side view of a cap 200 according to the second embodiment, and FIG. 4B is a side view of a cap 300 according to the third embodiment. FIG. 4C is a side view of a cap 350 according to the fourth embodiment.

As shown in FIG. 4A, the cap 200 according to the second embodiment differs from the cap 10 shown in FIG. 1 in respect of the shape of a circumferential projection 224. An outer circumferential surface 224a of the circumferential projection 224 is formed to have a slope. A first outer diameter 224b of the circumferential projection 224 of a side edge toward the body 20 is formed to be larger than a second outer diameter 224c of a side edge toward the support 22. Because the smaller, second outer diameter 224c is inserted into the mounting hole 14 to lead the first outer diameter 224b, mountability is improved and, at the same time, the likelihood of dislodging is reduced by engaging the large, first outer diameter 224b with the circumferential groove 16.

The first outer diameter 224b of the circumferential projection 224 is the outermost diameter of the circumferential projection 224 and is configured to be substantially equal to or smaller than the inner diameter R1 of mounting hole 14. This facilitates insertion into the mounting hole 14.

The second outer diameter 224c may be larger or equal to the outer diameter of the support 22.

As shown in FIG. 4B, the cap 300 according to the third embodiment differs from the cap 10 shown in FIG. 1 in that a flange 30 is formed on the exposed surface on top of a body 320. The flange 30 comes into contact with the edge of the opening of the mounting hole 14 and restricts the movement of the cap 300 in a direction toward the bottom of the mounting hole 14. In the cap 300 according to the third embodiment, the surface of the flange 30 is the designed surface 32. The body 320 is located more toward the designed surface 32 than the circumferential projection 24 and the support 22 is located more toward the bottom of the mounting hole or more toward the leading edge in the direction of insertion than the circumferential projection 24.

The flange 30 and the projecting part 24a of the circumferential projection 24 restrict the movement of the cap 10 in the axial direction and prevents the cap 10 from becoming too loose in the axial direction. A circumferential recessed step on which the flange 30 is latched is formed toward the opening of the mounting hole 14 of the wheel 12.

As shown in FIG. 4c, the cap 350 according to the fourth embodiment differs from the cap 10 shown in FIG. 3A in respect of the shape of a circumferential projection 324. The circumferential projection 324 according to the fourth embodiment is formed such that a corner edge 324b toward the support 22 is more rounded than a corner edge 324a toward the body 20 and such that the cross section of the circumferential projection 324 is arc-shaped. Because the rounded corner edge 324b toward the support 22 is inserted into the mounting hole 14 first, mountability is improved and, at the same time, the likelihood of dislodging is reduced by engaging the corner edge 324a toward the body 20 with the circumferential groove 16.

Figure 5:
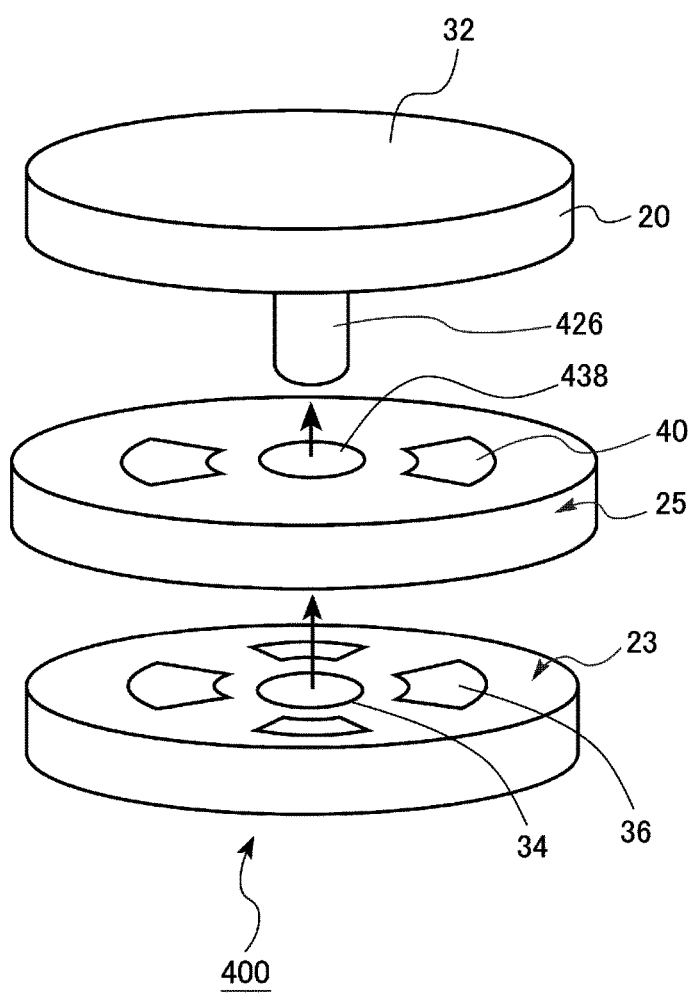
FIG. 5 is an exploded view of the cap according to another embodiment.

FIG. 5 is an exploded view of a cap 400 according to the fifth embodiment; As compared to the cap 10 shown in FIG. 2, the inner diameter of a through hole 438 of the cap 400 according to the fifth embodiment is larger than the outer diameter of a joint shaft 426 and a gap is provided between the outer circumferential surface of the joint shaft 426 and the inner circumferential surface of the through hole 438. This allows the circumferential projection 25 to be eccentric with respect to the joint shaft 426.

Further, the circumferential projection 25 has through recesses 40 around the through hole 438. The support 23 has a plurality of insertion holes 36 around the joint hole 34.

Figure 6A:
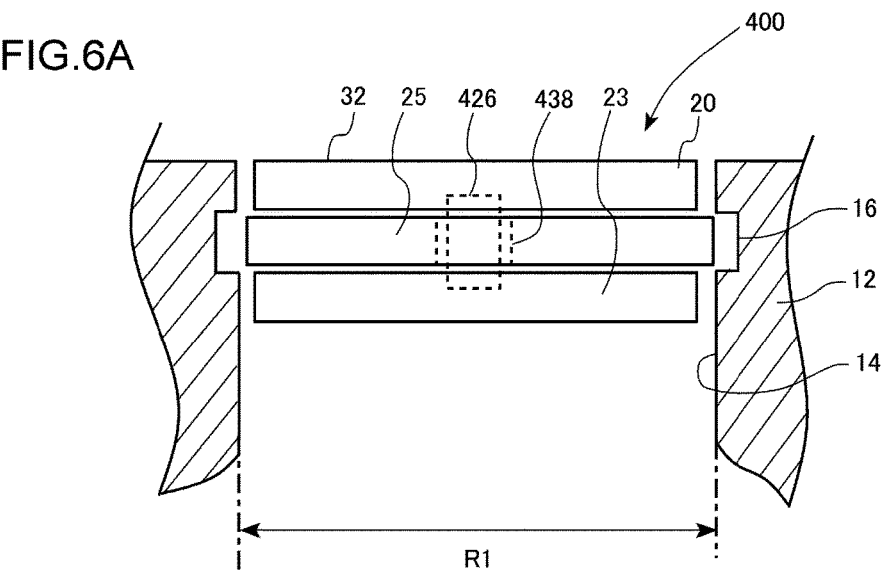
FIG. 6A shows how the cap is inserted into the mounting hole of the wheel.
Figure 6B:
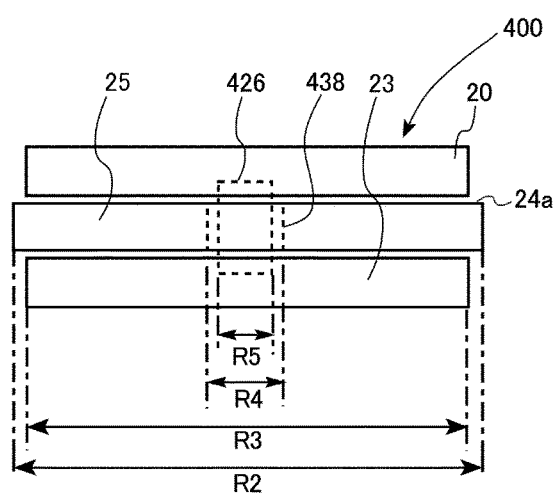
FIG. 6B shows the dimension of the features of the cap.
Figure 7:
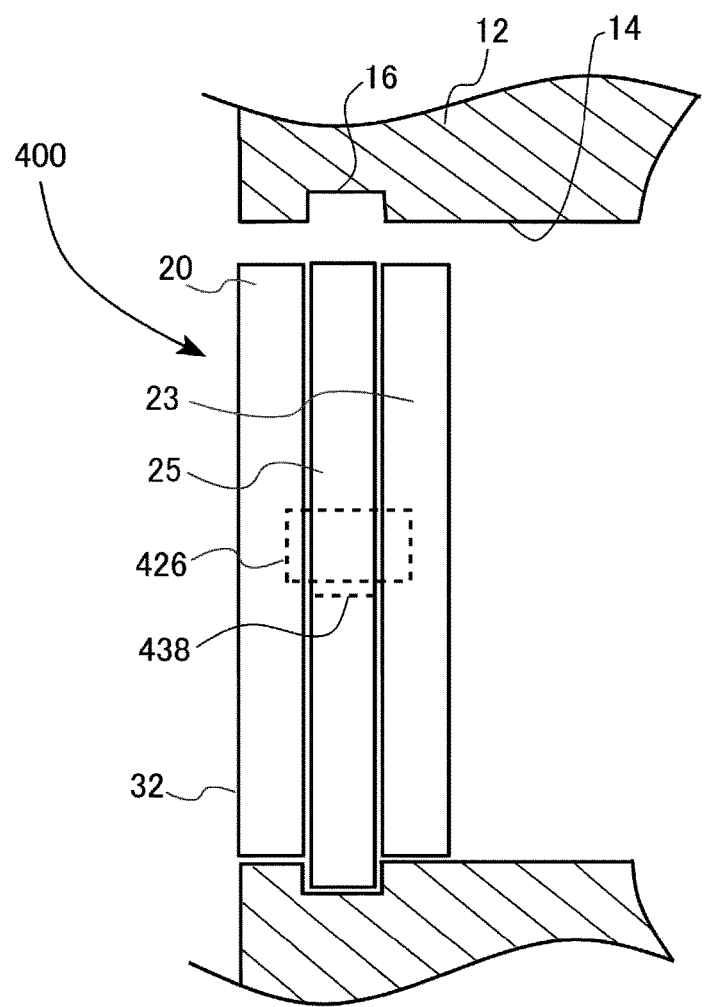
FIG. 7 shows the cap in use and mounted to the wheel.

FIG. 6A shows how the cap 400 according to the fifth embodiment is inserted into the mounting hole 14 of the wheel 12, and FIG. 6B shows the dimension of the features of the cap 400. FIG. 7 shows the cap 400 in use and mounted to the wheel 12.

As shown in FIG. 6A, the inner diameter of the through hole 438 is larger than the outer diameter of the joint shaft 426 and a gap is provided between the outer circumferential surface of the joint shaft 426 and the inner circumferential surface of the through hole 438. As shown in FIG. 7, when the cap 400 becomes eccentric so that the body 20 and the support 23 come into contact with the inner circumferential surface of the mounting hole 14, the circumferential projection 25 becomes more eccentric with respect to the joint shaft 426, entering the circumferential groove 16 by an amount equal to half the difference between the inner diameter R4 of the through hole 438 and the outer diameter R5 of the joint shaft 426. By allowing the circumferential projection 25 to become eccentric with respect to the joint shaft 426, the amount by which the circumferential projection 25 enters the circumferential groove 16 is increased as compared to the case of the cap 10 shown in FIG. 3B.

In other words, the length $(R2-R3)/2$ of the cap 10 shown in FIG. 3B enters the circumferential groove 16, but the circumferential projection 25 of the cap 400 enters the circumferential groove 16 by an amount equal to the length $(R2-R3)/2+(R4-R5)/2$, so that the likelihood of dislodging is reduced. The length $(R2-R3)/2$ is the amount by which the circumferential projection 25 enters the circumferential groove 16 due to the eccentricity with respect to the mounting hole 14, and the length $(R4-R5)/2$ is the amount by which the circumferential projection 25 enters the circumferential groove 16 due to the eccentricity of the circumferential projection 25 with respect to the joint shaft 426.

The difference between the inner diameter R4 of the through hole 438 and the outer diameter R5 of the joint shaft 426 may be configured to be accommodated in a range 0.6-1.2 mm. This prevents the joint shaft 26 and the circumferential projection 25 from becoming too loose from each other.

If the eccentricity of the circumferential projection 25 with respect to the joint shaft 426 is equal to or larger than a predetermined value, i.e., if the inner diameter R4 of the through hole 438 is larger than the outer diameter R5 of the joint shaft 426 by a predetermined value or larger, the circumferential projection 25 is prevented from being removed from the circumferential groove 16 regardless of the position of the cap 400 inside the mounting hole 14. It is preferable that the difference between the inner diameter R4 of the through hole 438 and the outer diameter R5 of the joint shaft 426 be equal to larger than the difference between the inner diameter R1 of the mounting hole 14 and the outer diameter R3 of the body 20 and the support 22. In other words, it is preferable that expression A below be satisfied.

$$(R4-R5) \geq (R1-R3) \qquad A$$

By satisfying expression A above, the cap 400 is prevented from being dislodged from the mounting hole 14 regardless of the position of the body 20 and the support 23 inside the mounting hole 14, provided that the circumferential projection 25 is in contact with the joint shaft 426 and is eccentric. In other words, the circumferential projection 25 can remain in the circumferential groove 16 even if the body 20 is raised upward while the circumferential projection 25 is accommodated in the circumferential groove 16 due to gravity as shown in FIG. 7.

To remove the cap 400 from the mounting hole 14, the insertion hole 36 of the support 23 and the recesses 40 of the circumferential projection 25 shown in FIG. 5 are used. A jig or a finger is inserted into the insertion hole 36 to catch and move the recess 40 of the circumferential projection 25 so that the central axis of the circumferential projection 25 is aligned with the central axis of the mounting hole 14. The cap 400 can be removed by pushing the cap 400 toward the opening of the mounting hole 14.

Figure 8:
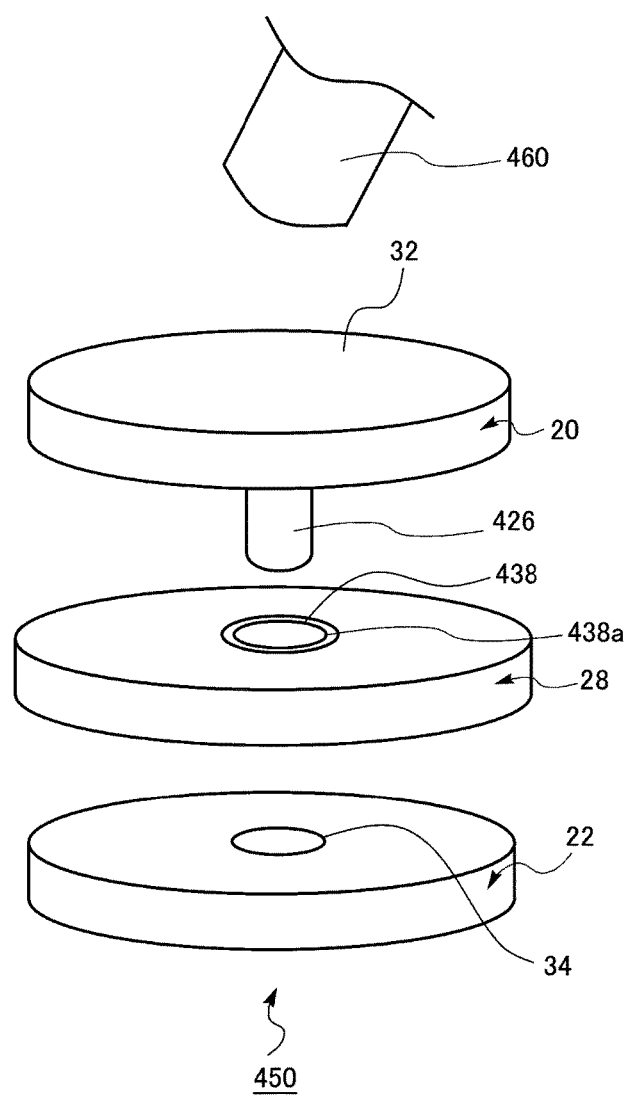
FIG. 8 shows a cap according to a variation of the fifth embodiment.

FIG. 8 shows a cap 450 according to a variation of the fifth embodiment. As compared with the cap 400 shown in FIG. 5A, the cap 450 according to the variation differs in the material of an inner circumferential part 438a of the through hole 438 of the circumferential projection 28. The inner circumferential part 438a of the cap 450 is formed of an annular magnetic body and so is different from the body of the circumferential projection 28 formed of a resin material. The body 20 and the support 22 are also formed of a resin material.

By forming the inner circumferential part 438a of the circumferential projection 24 by a magnetic body, the circumferential projection 24 loosely fitted to the joint shaft 426 can be moved by a magnet 460 in a radial direction without moving the body 20 and the support 22. This allows the circumferential projection 24 entering the circumferential groove 16 of the mounting hole 14 shown in FIG. 7 to be moved by the magnet 460, to be aligned with the central axis of the mounting hole 14, and to be removed from the circumferential groove 16 and removes the cap 450 from the mounting hole 14. The magnetic body may not necessarily be formed in the inner circumferential part 438a of the through hole 438 of the circumferential projection 24 but may be formed at a position between the outer circumference and the inner circumference.

The embodiments of the present invention are not limited to those described above and various modifications such as design changes may be made based on the knowledge of a skilled person. The features shown in the drawings are by way of example only and can be modified as appropriate so long as the same functionality can be achieved.

For example, the outer circumferential surface of the circumferential projection 24 is formed as a smooth cylinder but the shape of the outer circumferential surface is not limited to this. For example, the circumferential projection 24 may be formed as a polygonal column. Parts of the circumferential projection 24 may be provided with notches that segment the circumferential projection 24 in the circumferential direction but the circumferential projection 24 is configured to project over the entire circumference.

What is claimed is:

1. A cap mounted to a mounting hole of a wheel, the mounting hole being formed to have a circumferential groove, the cap comprising:
   a circular body; and
   a circumferential projection that projects relative to an outer circumferential surface of the body in a radial direction, wherein:
   an outermost diameter of the circumferential projection defines a maximum outer diameter of the cap and is not more than a minimum inner diameter of the mounting hole, the minimum inner diameter extending from an opening side of the circumferential groove, and the circumferential projection is received in the circumferential groove of the mounting hole so that the cap is mounted to the wheel.

2. The cap according to claim 1, further comprising:
   a joint shaft that joins the body and the circumferential projection, wherein
   the circumferential projection includes a through hole through which the joint shaft is inserted, and
   an outer diameter of the joint shaft is smaller than an inner diameter of the through hole.

3. A cap mounted to a mounting hole of a wheel, the mounting hole being formed to have a circumferential groove, the cap comprising:
   a circular body; and
   a circumferential projection that projects relative to an outer circumferential surface of the body in a radial direction, wherein:
   an outermost diameter of the circumferential projection defines a maximum outer diameter of the cap and is not more than a minimum diameter of the mounting hole, and the circumferential projection is received in the circumferential groove of the mounting hole so that the cap is mounted to the wheel.

4. The cap according to claim 3, wherein the circumferential projection is received in the circumferential groove eccentrically with respect to a central axis of the mounting hole.

5. The cap according to claim 1, wherein when the cap is mounted to the wheel, the circumferential projection is received in the circumferential groove while maintaining the outermost diameter of the circumferential projection, the circumferential projection extends around an entire surface of the cap, and an outer diameter of a cross section at a plane comprising the circumferential projection is constant.

6. The cap according to claim 3, wherein when the cap is mounted to the wheel, the circumferential projection is received in the circumferential groove while maintaining the outermost diameter of the circumferential projection, the circumferential projection extends around an entire surface of the cap, and an outer diameter of a cross section at a plane comprising the circumferential projection is constant.

* * * * *